United States Patent [19]
Gildersleeve

[11] 3,712,035
[45] Jan. 23, 1973

[54] MACHINE FOR DETASSELING CORN
[76] Inventor: Benjamin T. Gildersleeve, R.F.D. No. 1, Hudson, Ill. 61748
[22] Filed: March 25, 1971
[21] Appl. No.: 128,051

[52] U.S. Cl. ................................................56/63
[51] Int. Cl. ..............................................A01d 45/02
[58] Field of Search............56/63, 53, 56, 59, 60, 61, 56/63, 99, 100, 101, 102, DIG. 1; 171/58

[56]  References Cited

UNITED STATES PATENTS

| | | | |
|---|---|---|---|
| 2,660,013 | 11/1953 | Priestley | 171/58 |
| 2,337,699 | 12/1943 | Walz | 171/58 |
| 3,437,152 | 4/1969 | Barrentine | 171/58 |
| 3,524,308 | 8/1970 | Spry | 56/DIG. 1 |
| 3,398,515 | 8/1968 | Ash | 56/63 |
| 1,349,266 | 8/1920 | Cogburn | 56/53 |

Primary Examiner—Louis G. Mancene
Assistant Examiner—J. N. Eskovitz
Attorney—Clarence A. O'Brien and Harvey B. Jacobson

[57]  ABSTRACT

A support for movement horizontally along the upper ends of cornstalks and including a pair of side-by-side driven friction wheels with adjacent peripheral portions rollingly engaged with each other for frictionally engaging and positively driving the upper portions of cornstalks therebetween. The frame includes a generally horizontal stationary cutting blade adjacent and spaced vertically relative to the adjacent peripheral portions of the friction wheels for cutting and thus removing the top and tasseled portions of cornstalks passing between the friction wheels.

12 Claims, 6 Drawing Figures

Benjamin T. Gildersleeve
INVENTOR

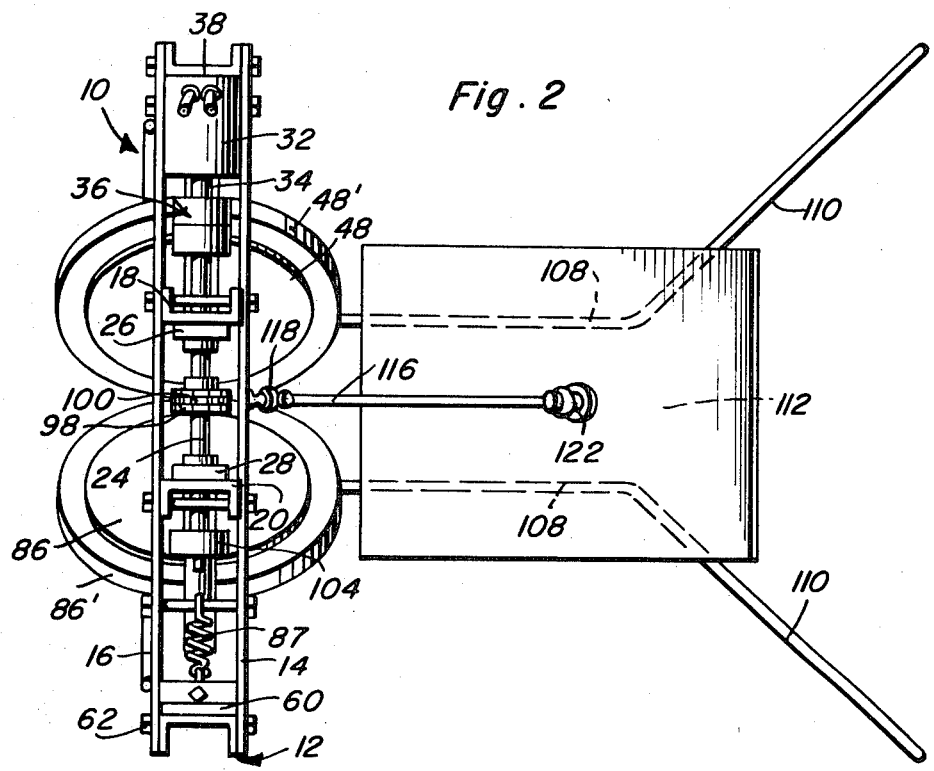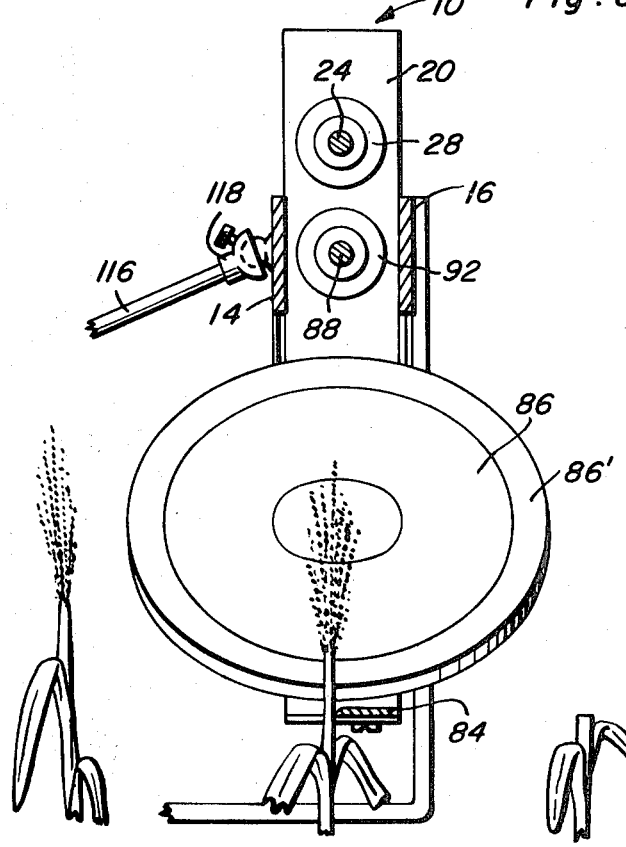

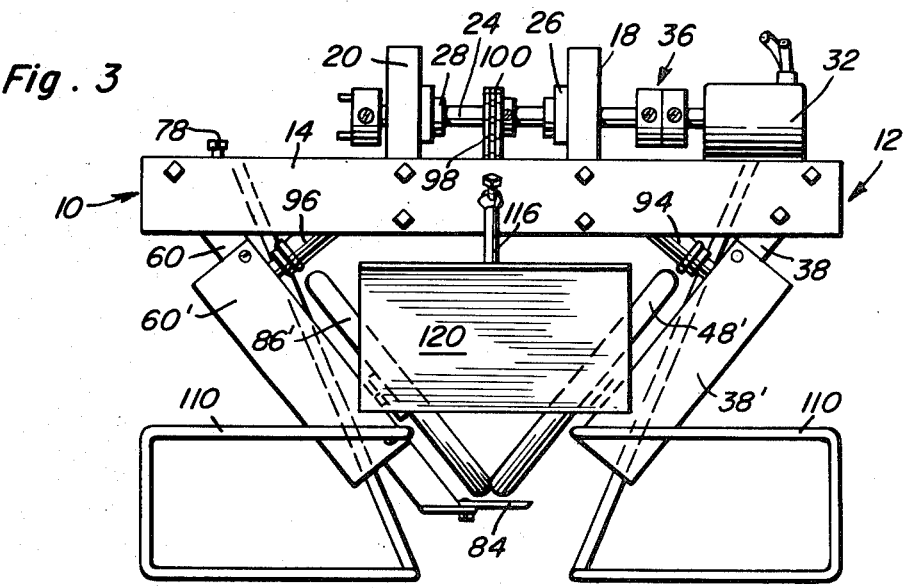
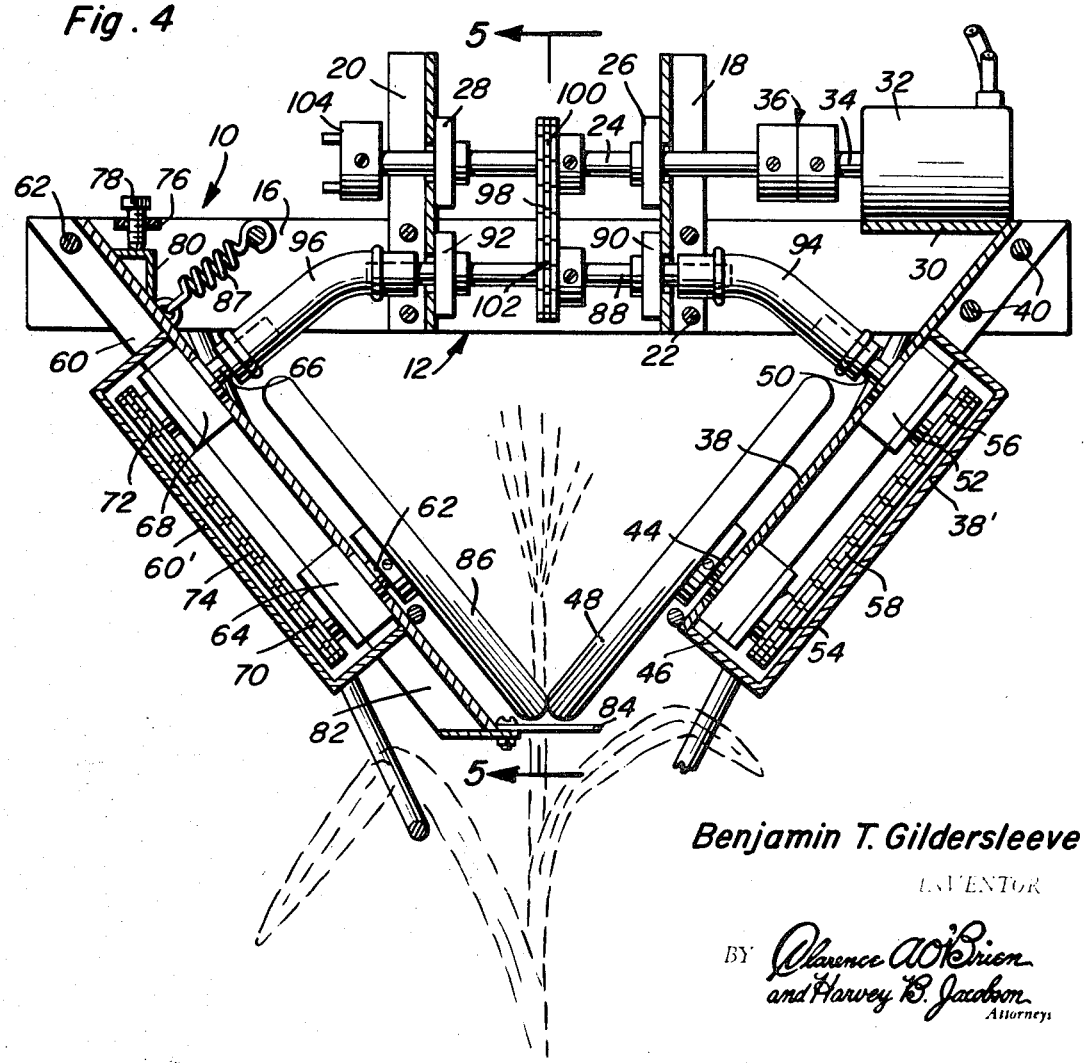

MACHINE FOR DETASSELING CORN

This invention relates to an apparatus for removing tassels from corn. The removal of corn tassels is a process usually referred to as detasseling and is commonly performed by manual removal of the tassels from the tops of the ear parent or seed corn producing female rows in hybrid seed corn production fields. The removal of the tassels or the male portion of the plants is performed prior to their release of pollen as a method of controlling pollenation or male parentage in the field. Since corn is planted at a rate of many thousand plants per acre, manual removal of the tassel from each plant is very time consuming, expensive and difficult to attain in the timely fashion required for proper pollen control.

Mechanical removal of corn tassels has been attempted by various types of cutting devices such as rotary horizontal blades, sickle mowers and crushing devices. These devices are dangerous to operate as well as injurous to the corn plant in that most operate either horizontally or cut in such a fashion so as to damage or cut off many of the top leaves of the corn plant adjacent to the tassel. These top leaves are the newest leaves of the plant and as such are the most functional in further growth and development of the plant. Untimely removal of these leaves results in grain yield reduction as well as a reduction in grain quality and finish.

It is accordingly the main object of this invention to provide an apparatus which will be operable to cut only the upper stalk portions from corn plants and to remove only those upper leaves of the corn plants which are outgrowths of the portions of the stalks removed.

Yet another object of this invention is to provide an apparatus in accordance with the preceding object and constructed in a manner whereby leaf outgrowths of corn plants below the upper portions of the stalks removed by the apparatus of the instant invention will be undamaged by the detasseling process.

Another object of this invention is to provide a corn detasseling apparatus operable to move along a row of corn plants of different heights and to detassel the corn plants or stalks with the cuts made on the stalks of the taller plants being performed at points spaced greater distances upwardly along the taller plants from the ground than the cuts made on the stalks of the smaller plants.

A still further object of this invention is to provide a corn detasseling apparatus which may be readily mounted upon various types of farm equipment for movement along rows of corn.

Another important object of this invention is to provide a corn detasseling apparatus including structural features adapting it for simplified gang operation.

A final object of this invention to be specifically enumerated herein is to provide a corn detasseling apparatus which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof wherein like numerals refer to like parts throughout, and in which:

FIG. 2 is a top plan view of the assemblage illustrated in FIG. 1;

FIG. 3 is a front elevational view of the assemblage illustrated in FIGS. 1 and 2;

FIG. 4 is a fragmentary enlarged transverse vertical sectional view taken substantially upon the plane indicated by the section line 4—4 of FIG. 1;

FIG. 5 is a longitudinal vertical sectional view taken substantially upon the plane indicated by the section line 5—5 of FIG. 4.

Figure 1:
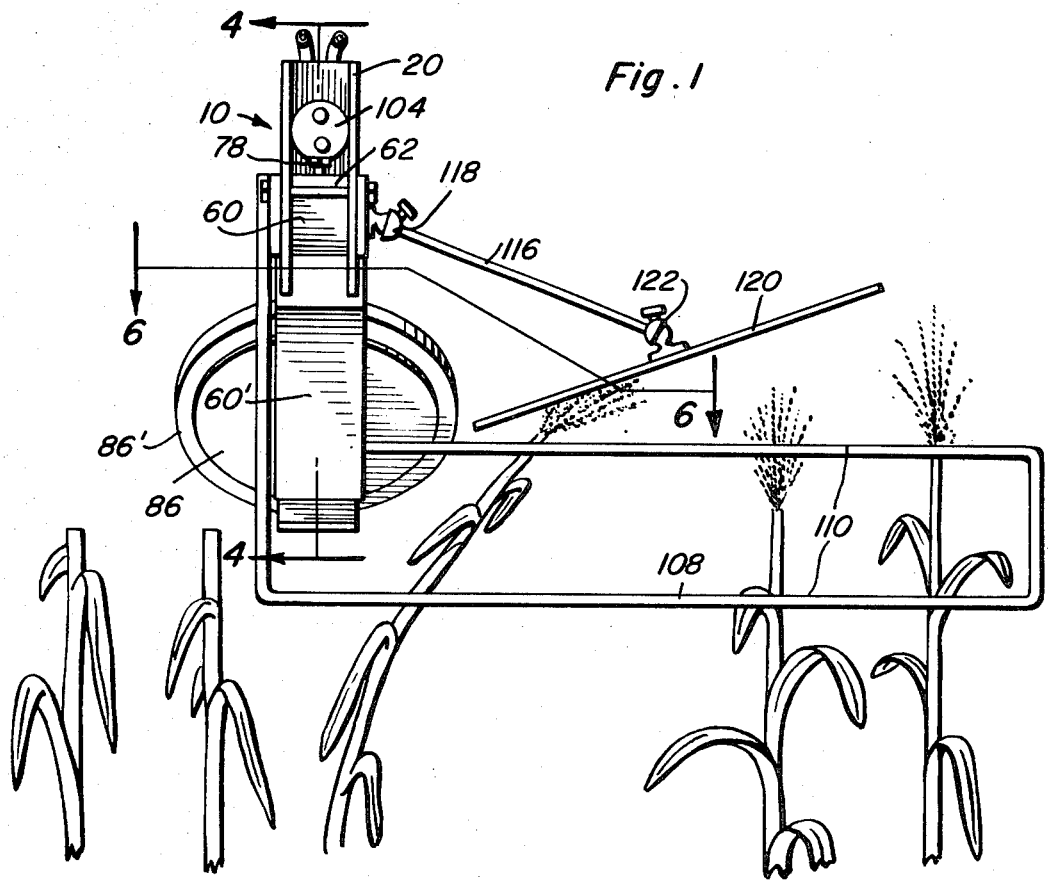
FIG. 1 is a side elevational view of a preferred embodiment of the corn detasseling apparatus of the instant invention and with the apparatus operatively associated with the top of a row of corn plants.
Figure 6:
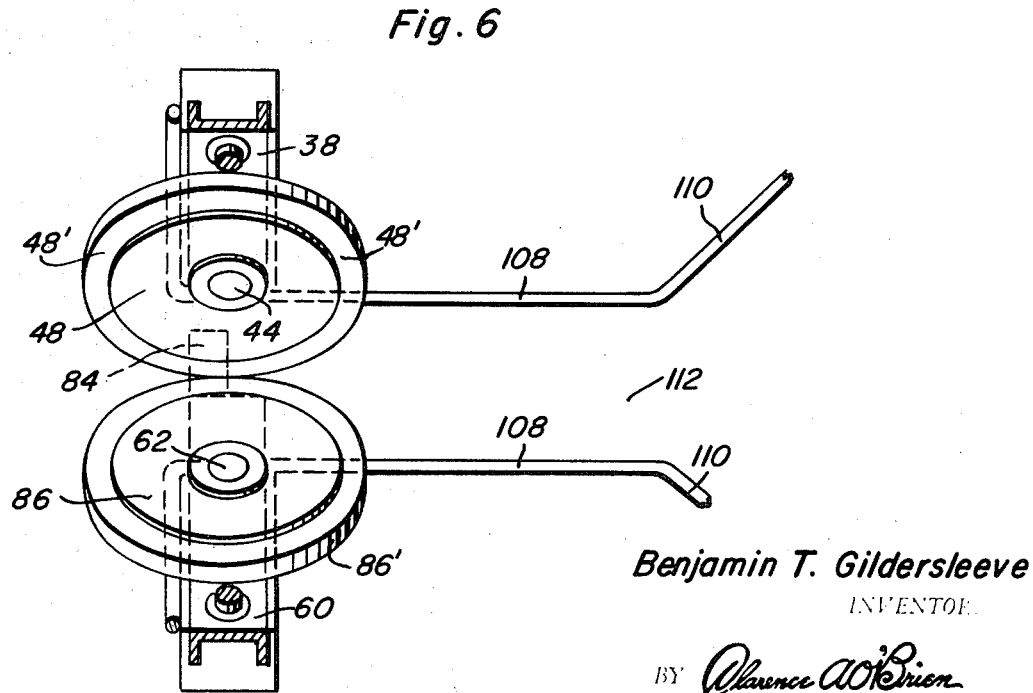
FIG. 6 is a horizontal sectional view taken substantially upon the plane indicated by the section line 6—6 of FIG. 1.

Referring now more specifically to the drawings, the numeral 10 generally designates the corn detasseling apparatus of the instant invention. The apparatus 10 includes a support frame referred to in general by the reference numeral 12 and consisting of a pair of elongated front and rear generally horizontal transverse plates 14 and 16 interconnected centrally intermediate their opposite ends by a pair of upstanding channel members 18 and 20 secured therebetween by means of suitable fasteners 22. The channel members 18 and 20 are disposed between the plates 14 and 16 at points spaced longitudinally along the latter and a jack shaft 24 is journalled through the upper end portions of the channel members 18 and 20 by means of bearing assemblies 26 and 28 carried by the channel members 18 and 20. A horizontal cross plate 30 is secured between the upper marginal edge portions of the left hand ends of the plates 14 and 16 in any convenient manner and a hydraulic motor 32 is supported from the cross plate 30 and includes a drive shaft 34 aligned with the jack shaft 24 and drivingly coupled thereto by means of a shaft coupling assembly referred to in general by the reference numeral 36.

A first left hand downwardly and inwardly inclined support arm 38 is secured, as by fasteners 40, between the left hand ends of the plates 14 and 16 and it will be noted that the support arm 38 comprises a channel member. A first stub axle 44 is journalled from the lower end of the support arm 38 by means of a bearing assembly 46 and the stub axle 44 is disposed generally normal to the support arm 38 and has a first friction drive wheel mounted on its upper end. The support arm 38 also journals an imput shaft 50 by means of a bearing assembly 52 and the input shaft 50 generally parallels the stub axle 44 and is supported from an upper portion of the support arm 38. The shafts 46 and 50 have sprocket wheels 54 and 56 mounted thereon in alignment with each other and an endless drive chain 58 is trained about the sprocket wheels 54 and 56.

A second right hand support arm 60, which is also downwardly and inwardly inclined, has its upper end pivotally secured between the right hand ends of the plates 14 and 16 by means of a pivot fastener 62 and the support arm 60 is also defined by a channel member. The support arm 60 includes a stub axle 62 corresponding to the stub axle 44 and journalled in position by means of a bearing assembly 64, an input shaft 66 corresponding to the input shaft 50 and journalled in position by a bearing assembly 68 corresponding to the bearing assembly 52 and sprocket wheels 70 and 72 corresponding to the sprocket wheels 54 and 56 about which an endless drive chain 74 corresponding to the drive chain 58 is trained.

An abutment screw support 76 is secured between the upper marginal portions of the right hand ends of the plates 14 and 16 and an abutment screw 78 is threadedly engaged with the support 76 and includes a lower end engageable by an abutment angle iron 80 carried by an upper portion of the support arm 60.

The support arm 60 is slightly longer than the support arm 38 and includes a lower end extension 82 supporting a horizontally disposed and transversely extending cutting blade 84 and the blade 84 is disposed closely adjacent and underlies the lower marginal edge portion of the drive wheel 48 and also the drive wheel 86 mounted on the stub axle 62. The lower peripheral portions of the drive wheels 48 and 86 are disposed in rolling contact engagement with each other and the drive wheels 48 and 86 include resilient peripheral portions 48' and 86' for frictionally engaging cornstalks and drivingly engaged cornstalks between the wheels 48 and 86.

An expansion spring 87 is connected between the support arm 60 and the plates 14 and 16 and serves to swing the lower end of the support arm 60 and its extension 82 upwardly and inwardly toward the drive wheel 48 whereby the drive wheel 86 will be maintained in frictional rolling engagement with the drive wheel 48. Also, a drive shaft 88 is journalled between the channel members 18 and 20 from bearing assemblies 90 and 92 supported from the adjacent sides of the channel members 18 and 20 and a pair of flexible shaft components 94 and 96 drivingly coupled remote ends of the drive shaft 88 to the input shaft 50 and 66, respectively. An endless drive chain 98 is trained about a sprocket wheel 100 carried by the jack shaft 24 and a sprocket wheel 102 mounted on the drive shaft 88 and accordingly, rotation of the drive shaft 34 is operative to rotate the drive wheels 48 and 86.

The end of the jack shaft 24 remote from the motor 32 includes one-half of a shaft coupling assembly 104 whereby the jack shaft 24 may be coupled to a similar jack shaft of a second corn detasseling assembly, such as the assembly 10, disposed to the right of the latter and in this manner a plurality of aligned corn detasseling assemblies may be utilized in gang fashion to simultaneously cut the tassels from the tops of the corn plants in a plurality of rows of corn plants.

Each of the support arms 44 and 60 includes a forwardly projecting guide arm 108 and the forward ends of the guide arms 108 include laterally outwardly angulated portions 110 defining a corn stalk receiving throat 112 therebetween. In this manner, all of the stalks in a row of corn plants will be guided into position for movement between the drive wheels 48 and 86 as the apparatus 10 is moved along the row of corn plants. In operation, as the apparatus 10 is moved along a row of corn plants in elevated position relative to the ground and in approximately the correct elevation with the cutting blade 84 being disposed for horizontal movement just beneath the lower portions of the tassels on the shorter plants in each row, the upper ends of the plants or stalks are guided into alignment with the lower peripheral portions of the drive wheels 48 and 86 between the components 108. As the driven wheels 48 and 86 engage successive corn plants, they are driven rearwardly between the wheels 48 and 86 with the result that each corn stalk or plant has the upper tasseled portion thereof cut from the remainder of the plant at an elevation immediately beneath that portion of the corn stalk passing between the lower peripheral portions of the drive wheels 48 and 86.

From FIG. 4 of the drawings, it will be seen that because the support arms 44 and 60 are downwardly and inwardly inclined toward their adjacent ends, the lower peripheral portions of the drive wheels 48 and 86 reach downwardly along the upper portion of the corn stalks to be cut in order that out croppings of leaves of the plants or stalks disposed below the elevation at which the stalks will be cut are not damaged.

With attention now invited more specifically to FIGS. 1 and 2 of the drawings, it may be seen that the assembly 10 includes a forwardly projecting support arm 116 adjustably swivelly supported at its rear end as at 118 from the central portion of the plate 14. The forward end of the support arm 116 supports a deflection plate 120 and the deflection plate is adjustably universally supported from the support arm 116 as at 122. The deflection plate 120 serves to engage and forwardly deflect the upper ends of the taller corn stalks or plants in a row of plants along which the apparatus 10 is being moved. In this manner, the upper tasseled ends of taller corn plants are bent forwardly in the direction of movement of the apparatus 10 until the upper less stiff portions of the corn stalks immediately beneath the tassels slide beneath the deflection plate 120 and thus the cuts made on even the taller corn plants are made at an elevation just below the tasseled upper ends thereof. In this manner, even the upper newer leaves on the taller corn plants are not damaged by the detasseling apparatus 10. Further, the lower end portions of the arms 38 and 60 include removable covers 38' and 60' for covering the chains 58 and 74 as well as the associated sprocket wheels.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A support frame including front ad rear portions and adapted for forward movement horizontally along the tops of plant stalks and including a pair of opposite side side-by-side rotary friction wheel means with adjacent peripheral portions disposed for rollingly engaging opposite sides of a stalk passing therebetween, at least one of said wheel means being driven in a direction to engage and drive a stalk passing between said adjacent peripheral portions rearwardly relative to said frame, the frame including a generally horizontal cutting blade stationarily supported closely beneath said adjacent peripheral portions and in a vertical plane containing a transverse line extending between said adjacent peripheral portions of the wheel means for cutting and thus removing the top portions of the plant and stalks engaged by and passing rearwardly between the friction wheel means.

2. The combination of claim 1 wherein said support frame includes a drive motor, said drive motor being drivingly connected to at least one of said friction wheel means.

3. The combination of claim 2 wherein said motor is drivingly connected to both of said friction wheel means.

4. The combination of claim 1 wherein said friction wheel means are journalled for rotation about upwardly converging axes substantially paralleling a vertical plane normal to the direction of intended movement of said support frame.

5. The combination of claim 4 including means mounting one of said friction wheel means on said frame for swinging about a generally horizontally disposed axis extending in a front to rear direction relative to said frame and elevated above said one wheel means, and spring means connected between said frame and one wheel means operative to yieldingly bias said one friction wheel means toward the other friction wheel with said peripheral portions rollingly engaged with each other.

6. The combination of claim 5 including means operative to limit shifting of said one friction wheel toward said other friction wheel means whereby said adjacent peripheral portions may be maintained in at least slightly spaced relation.

7. The combination of claim 1 wherein one of said friction wheel means is mounted for shifting generally radially of the other of said friction wheel means, said cutting blade being supported for movement with said one friction wheel means generally radially of the other of said friction wheel means.

8. The combination of claim 1 including a pair of front to rear extending guide arms supported from said support frame and projecting forwardly therefrom, at least the forward end portions of said guide arms being forwardly divergent in horizontal directions, the rear ends of said guide arms defining an entrance throat therebetween disposed forwardly of and aligned with the adjacent peripheral portions of said friction wheels means for guiding the upper portions of plants between said adjacent peripheral portions of said friction wheel means.

9. The combination of claim 1 including a deflection plate supported forwardly of said support frame at an elevation at least slightly above said cutter means, said deflection plate disposed forward of said cutting means and operative to forwardly deflect the upper ends of taller plants toward which said support frame is forwardly advanced.

10. The combination of claim 9 including a pair of front to rear extending guide arms supported from said support frame and projecting forwardly therefrom, at least the forward end portions of said guide arms being forwardly divergent in horizontal directions, the rear ends of said guide arms defining an entrance throat therebetween disposed forwardly of and aligned with the adjacent peripheral portions of said friction wheel means for guiding the upper portions of plants between said adjacent peripheral portions of said friction wheel means.

11. The combination of claim 10 including means operative to limit shifting of said one friction wheel means toward said other friction wheel means whereby said adjacent peripheral portions may be maintained in at least slightly spaced relation.

12. The combination of claim 11 wherein one of said friction wheel means is mounted for shifting generally radially of the other of said friction wheel means, and spring means operative to yieldingly bias said one friction wheel toward the other friction wheel means with said peripheral portions rollingly engaged with each other.

* * * * *